(12) United States Patent
Zander et al.

(10) Patent No.: US 11,104,098 B2
(45) Date of Patent: Aug. 31, 2021

(54) FIBROUS VEHICLE UNDERBODY SHIELD

(71) Applicant: Cadillac Products Automotive Company, Troy, MI (US)

(72) Inventors: Robert J. Zander, Troy, MI (US);
Michael Demo, Macomb, MI (US);
Kenneth Ritzema, Clarkston, MI (US)

(73) Assignee: Cadillac Products Automotive Company, Troy, MI (US)

( * ) Notice: Subject to any disclaimer, the term of this patent is extended or adjusted under 35 U.S.C. 154(b) by 282 days.

(21) Appl. No.: 15/583,434

(22) Filed: May 1, 2017

(65) Prior Publication Data

US 2017/0341335 A1    Nov. 30, 2017

Related U.S. Application Data

(60) Provisional application No. 62/343,328, filed on May 31, 2016.

(51) Int. Cl.
*B32B 5/02* (2006.01)
*B29C 43/02* (2006.01)
(Continued)

(52) U.S. Cl.
CPC .............. *B32B 5/022* (2013.01); *B29C 43/02* (2013.01); *B29C 44/1209* (2013.01);
(Continued)

(58) Field of Classification Search
CPC ................ B29C 43/02; B29C 44/1209; B29C 2791/001; B29C 43/46; B29C 43/52; B29C 44/08; B29C 44/5636; B32B 3/266; B32B 5/022; B32B 2037/243; B32B 2038/0084; B32B 2307/718; B32B 2307/72; B32B 2605/00; B62D 25/2072; B62D 29/04; B29K 2007/00; B29K 2105/0064; B29L 2031/3005
See application file for complete search history.

(56) References Cited

U.S. PATENT DOCUMENTS

| | | |
|---|---|---|
| 19,840 A | 4/1858 | Geisendorff |
| 3,103,254 A | 9/1963 | Stedman |
| | (Continued) | |

*Primary Examiner* — Frank J Vineis
*Assistant Examiner* — Laura B Figg
(74) *Attorney, Agent, or Firm* — Harness, Dickey & Pierce, P.L.C.

(57) ABSTRACT

A fibrous vehicle underbody shield and method for manufacturing the same is provided. A binderless core of non-woven fibrous material defines first and second surfaces of the fibrous vehicle underbody shield. The second surface of the fibrous vehicle underbody is opposite the first surface such that the first and second surfaces are separated by a final product thickness. The first and second surfaces include at least one molded contour that gives the first and second surfaces a non-planar shape. The non-woven fibrous material of the binderless core includes a plurality of fibers that are mechanically entangled with each other and have a coating that withstands a heat exposure of 200 degrees Celsius. The fibrous vehicle underbody shield includes a latex impregnation. The latex impregnation is disposed on at least one of the first and second surfaces and penetrates the non-woven fibrous material of the binderless core an impregnation distance.

26 Claims, 9 Drawing Sheets

(51) Int. Cl.

| | | |
|---|---|---|
| *B29C 44/12* | (2006.01) | |
| *B32B 3/26* | (2006.01) | |
| *B62D 25/20* | (2006.01) | |
| *B62D 29/04* | (2006.01) | |
| *B32B 37/24* | (2006.01) | |
| *B29K 7/00* | (2006.01) | |
| *B29C 43/46* | (2006.01) | |
| *B29K 105/00* | (2006.01) | |
| *B29C 43/52* | (2006.01) | |
| *B29C 44/08* | (2006.01) | |
| *B29L 31/30* | (2006.01) | |
| *B29C 44/56* | (2006.01) | |
| *B32B 38/00* | (2006.01) | |

(52) U.S. Cl.
CPC .......... *B32B 3/266* (2013.01); *B62D 25/2072* (2013.01); *B62D 29/04* (2013.01); *B29C 43/46* (2013.01); *B29C 43/52* (2013.01); *B29C 44/08* (2013.01); *B29C 44/5636* (2013.01); *B29C 2791/001* (2013.01); *B29K 2007/00* (2013.01); *B29K 2105/0064* (2013.01); *B29L 2031/3005* (2013.01); *B32B 2037/243* (2013.01); *B32B 2038/0084* (2013.01); *B32B 2307/718* (2013.01); *B32B 2307/72* (2013.01); *B32B 2605/00* (2013.01)

(56) References Cited

U.S. PATENT DOCUMENTS

| | | | |
|---|---|---|---|
| 4,081,418 A * | 3/1978 | Barua | ................ C08F 2/26 524/723 |
| 4,655,496 A | 4/1987 | Gahlau et al. | |
| 4,673,616 A * | 6/1987 | Goodwin | .............. D06M 23/14 264/319 |
| 4,908,176 A * | 3/1990 | Kato | ..................... D04H 1/425 264/122 |
| 5,824,974 A | 10/1998 | Campbell | |
| 5,834,711 A | 11/1998 | Haines | |
| 5,984,356 A * | 11/1999 | Uphaus | ................ B60G 99/006 180/312 |
| 6,617,002 B2 | 9/2003 | Wood | |
| 6,808,045 B2 | 10/2004 | Campbell | |
| 6,951,263 B2 | 10/2005 | Blomeling et al. | |
| 7,070,848 B2 | 7/2006 | Campbell | |
| 7,837,009 B2 | 11/2010 | Gross et al. | |
| 7,878,301 B2 | 2/2011 | Gross et al. | |
| 7,918,313 B2 | 4/2011 | Gross et al. | |
| 7,971,683 B2 | 7/2011 | Bayle et al. | |
| 8,966,845 B1 | 3/2015 | Ciuperca | |
| 9,375,893 B2 | 6/2016 | Nicholas et al. | |
| 2004/0129493 A1 | 7/2004 | Campbell | |
| 2005/0046217 A1 | 3/2005 | Campbell | |
| 2005/0046218 A1 | 3/2005 | Campbell | |
| 2007/0066176 A1 | 3/2007 | Wenstrup et al. | |
| 2008/0050565 A1* | 2/2008 | Gross | ....................... B32B 5/22 428/212 |
| 2008/0236936 A1 | 10/2008 | Niwa et al. | |
| 2010/0065366 A1 | 3/2010 | Soltau et al. | |
| 2010/0066121 A1 | 3/2010 | Gross | |
| 2010/0219561 A1* | 9/2010 | Pfaffelhuber | ......... B29C 43/006 264/320 |
| 2014/0262603 A1 | 9/2014 | Johnson | |

\* cited by examiner

FIBROUS VEHICLE UNDERBODY SHIELD

CROSS-REFERENCE TO RELATED APPLICATIONS

This application claims the benefit of U.S. Provisional Application No. 62/343,328, filed on May 31, 2016. The entire disclosure of the above referenced application is incorporated herein by reference.

FIELD

The subject disclosure generally relates to vehicle underbody shields, such as underbody aero shields and wheel well liners for automobiles, and to methods of manufacturing the same.

BACKGROUND

This section provides background information related to the present disclosure which is not necessarily prior art.

Vehicle underbody shields are commonly used in the automotive industry to improve the aerodynamics and appearance of vehicles and to provide a barrier preventing the egress of water and dirt from entering the underbody of the vehicle. Such underbody shields are commonly installed beneath the engine compartment, transmission tunnel, or chassis of a vehicle. When installed in these vehicle locations, the vehicle underbody shields may alternatively be referred to as underbody aero-shields because they help direct airflow beneath the vehicle and typically reduce drag. In another application, vehicle underbody shields may be installed between the body and wheels of the vehicle. When installed in these vehicle locations, the vehicle underbody shields may alternatively be referred to as wheel well liners. Common materials for known vehicle underbody shields are plastics, carbon fiber composites, and fibrous mats.

Carbon fiber underbody shields are lightweight and stiff, but are cost prohibitive in all but the most expensive vehicles, such as high-end performance cars and race cars. Carbon fiber also tends to be brittle and can crack or fracture if the vehicle underbody shield impacts a solid object such as a curb. Plastic is a much cheaper alternative to carbon fiber, but has a number of significant drawbacks. Plastic vehicle underbody shields are heavy compared to their carbon fiber counterparts. Plastic vehicle underbody shields are also brittle and have a tendency to crack or fracture from impacts with solid objects and road debris, particularly when the vehicle is operated in cold weather. Finally, plastic has a tendency to warp, droop, and in extreme cases melt when exposed to high temperatures. Accordingly, plastic vehicle underbody shields are not well suited for use in high temperature locations, such as directly beneath the engine or exhaust system of the vehicle. Fibrous mats traditionally have poor rigidity and therefore have to be secured to the vehicle using a large number of closely spaced attachment points and/or require a separate support structure. Although fibrous mats are not brittle like carbon fiber and plastic, they are heavy and tend to absorb water, further increasing their weight. Fibrous mats can also lose their rigidity and thus their functionality as an underbody shield when exposed to high temperatures so they are often fitted with one or more heat shields when used in high temperature locations of a vehicle. Accordingly, each of these materials have drawbacks when used for vehicle underbody shields.

SUMMARY

This section provides a general summary of the disclosure and is not a comprehensive disclosure of its full scope or all of its features.

In accordance with one aspect of the subject disclosure, a fibrous vehicle underbody shield is provided. The fibrous vehicle underbody shield includes a binderless core of non-woven fibrous material. The fibrous vehicle underbody shield has first and second surfaces that are formed by the binderless core. The second surface of the fibrous vehicle underbody is opposite the first surface such that the first and second surfaces are separated by a final product thickness. Accordingly, the final product thickness of the fibrous vehicle underbody shield is measured between the first and second surfaces. The first and second surfaces include at least one molded contour that gives the first and second surfaces a non-planar shape. The non-woven fibrous material of the binderless core includes a plurality of fibers that are mechanically entangled with each other. The fibrous vehicle underbody shield further includes a latex impregnation. The latex impregnation is disposed on at least one of the first and second surfaces and penetrates the non-woven fibrous material of the binderless core an impregnation distance.

In accordance with another aspect of the subject disclosure, the plurality of fibers of the non-woven fibrous material have a coating that adheres to the latex and withstands a heat exposure of at least 200 degrees Celsius.

In accordance with yet another aspect of the subject disclosure, a method is provided for manufacturing the fibrous vehicle underbody shield described above. The method includes the step of feeding the binderless core of non-woven fibrous material to a first roller, where the first roller includes a first outer cylindrical surface. The method proceeds with the step of passing the binderless core over the first roller such that the first surface of the binderless core contacts at least part of the first outer cylindrical surface of the first roller. The method further includes the step of foaming latex onto the second surface of the binderless core that is opposite the first surface, while the first surface of the binderless core remains in contact with at least part of the first outer cylindrical surface of the first roller. The method also includes the step of feeding the binderless core to a second roller, where the second roller includes a second outer cylindrical surface. The method proceeds with the step of passing the binderless core over the second roller such that the second surface of the binderless core contacts at least part of the second outer cylindrical surface of the second roller. The method further includes the step of foaming latex onto the first surface of the binderless core, while the second surface of the binderless core remains in contact with at least part of the second outer cylindrical surface of the second roller. Additionally, the method includes the steps of: feeding the binderless core to a molding press, compressing at least one segment of the binderless core in the molding press under heat to create at least one molded contour, and removing a finished molded fibrous vehicle underbody shield from the molding press.

Advantageously, the fibrous vehicle underbody shields disclosed herein are cheaper than carbon fiber, are lighter than plastic and fibrous mats, have improved performance in high heat applications, and are more resistant to damage from impacts.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
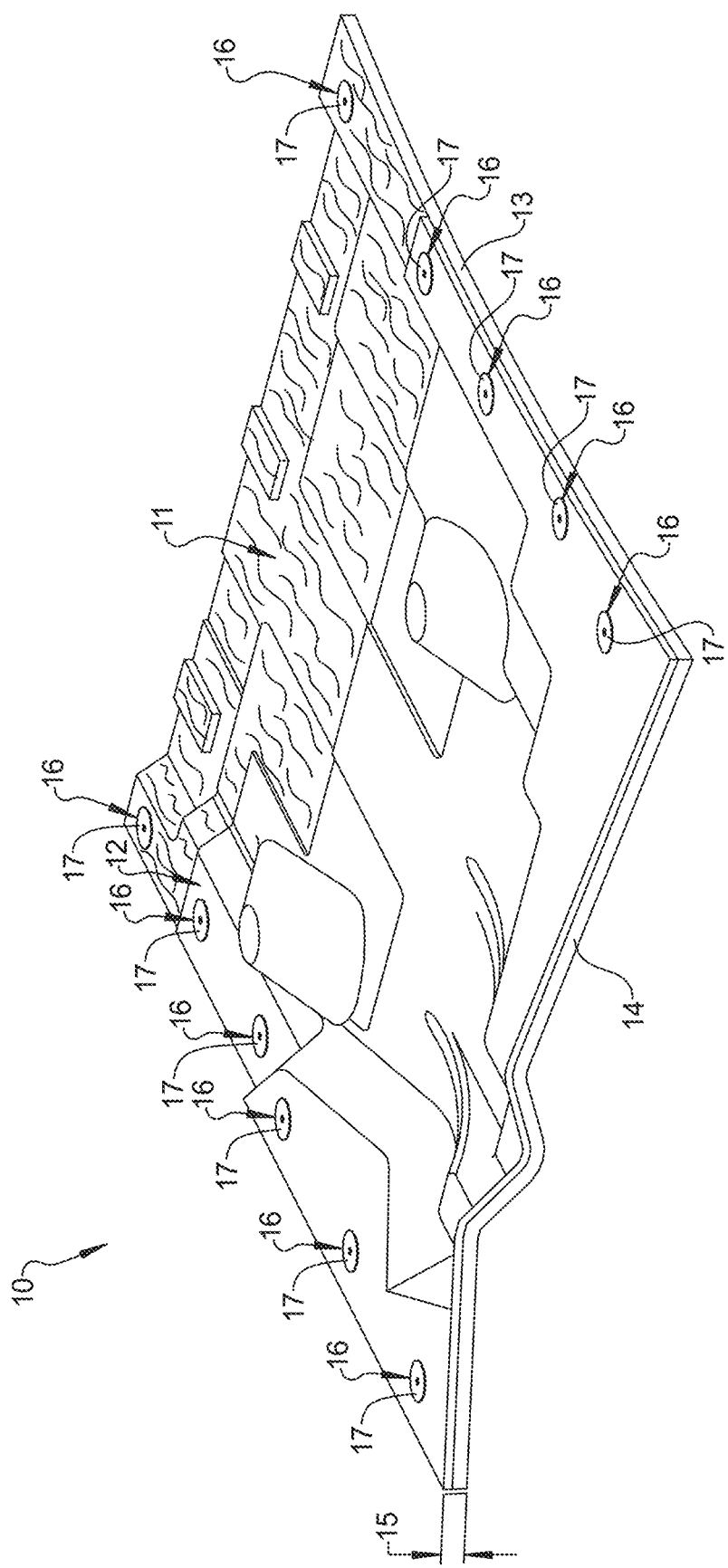
FIG. 1 is a top perspective view of an exemplary prior art underbody shield that includes an associated heat shield.
Figure 2:
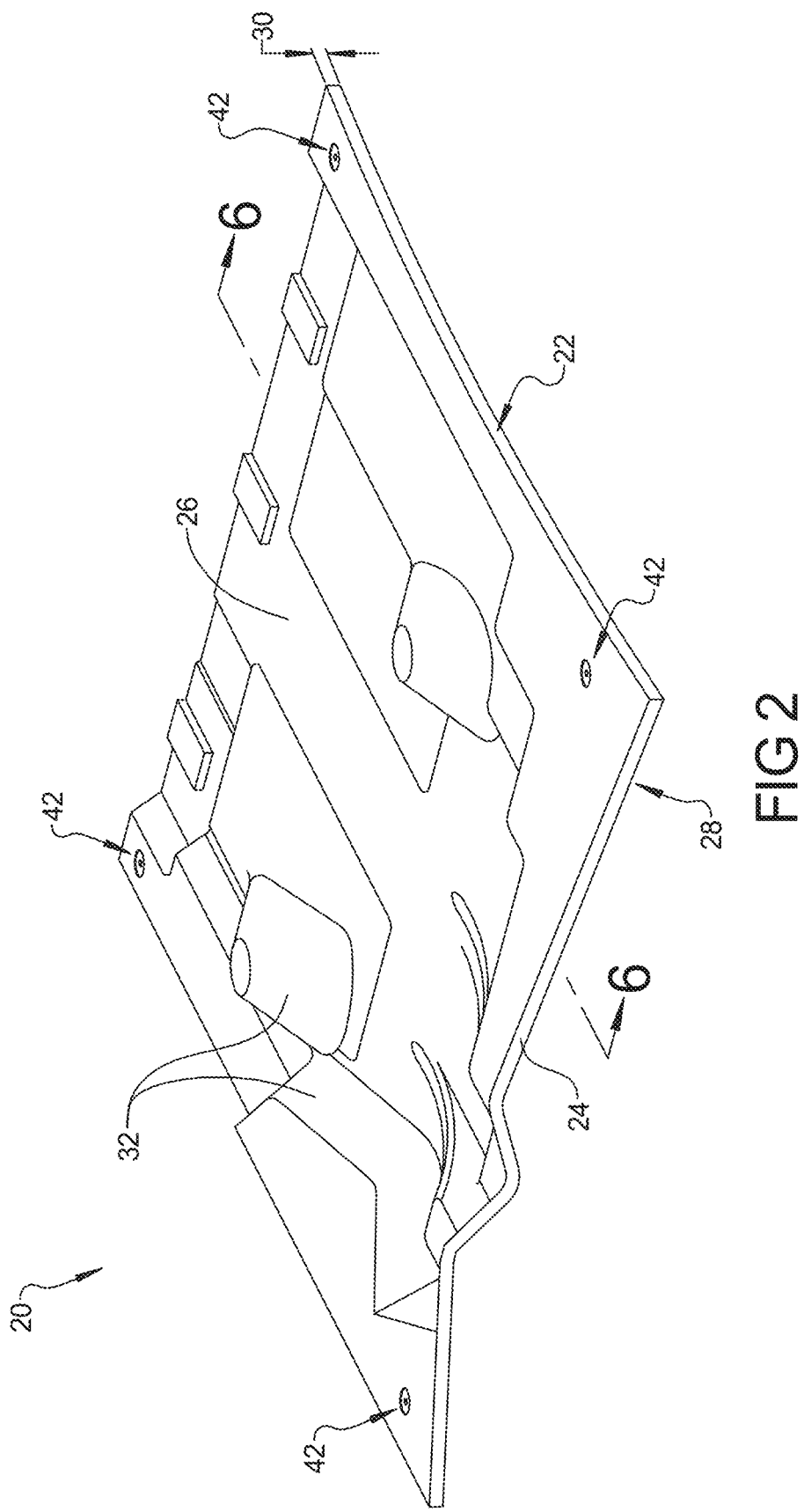
FIG. 2 is a top perspective view of an exemplary fibrous vehicle underbody shield that is constructed in accordance with the subject disclosure.
Figure 3:
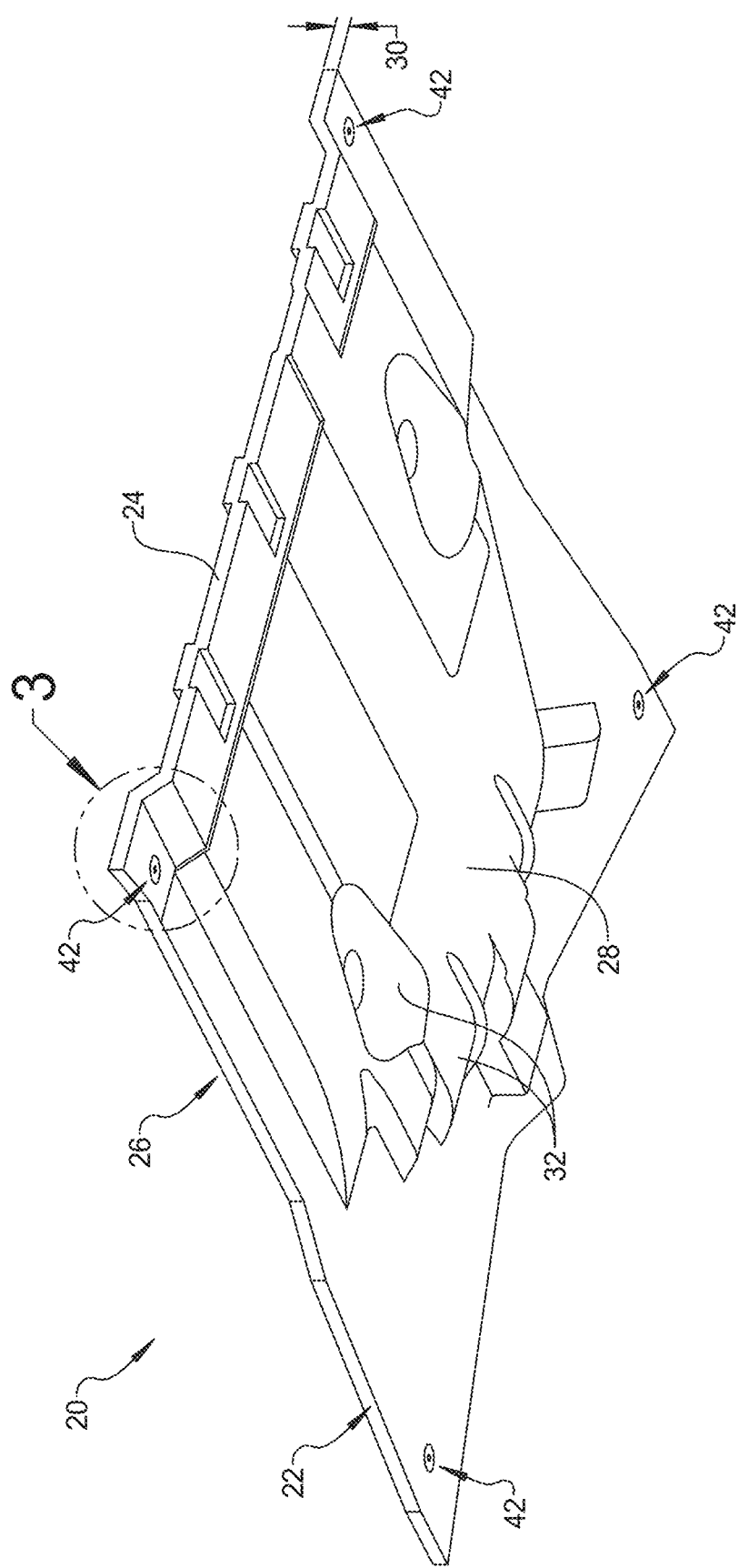
FIG. 3 is a bottom perspective view of the exemplary fibrous vehicle underbody shield illustrated in FIG. 2.

Referring to the Figures, wherein like numerals indicate corresponding parts throughout the several views, a fibrous vehicle underbody shield 20 is disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates an exemplary prior art vehicle underbody shield assembly 10. The vehicle underbody shield assembly 10 generally comprises a fibrous mat 11 and a heat shield 12 that is attached to the fibrous mat 11 with an adhesive (not shown). The fibrous mat 11 is made from a fibrous material 13, such as polyethylene terephthalate (PET), and the heat shield 12 is made from a thermal insulator 14, such as bonded or laminated aluminum foil. Typically, the fibrous material 13 of the fibrous mat 11 burns, melts, oxidizes, and/or otherwise degrades when exposed to a temperature of 200 degrees Celsius (° C.). Localized temperatures in excess of 200 degrees Celsius (° C.) are common in areas of the vehicle that are in close proximity to the exhaust system, which may include the exhaust header(s), exhaust pipe(s), catalytic converter(s), and muffler(s). The heat shield 12 protects the fibrous material 13 of the fibrous mat 11 in these high temperature locations. However, there are disadvantages to this approach. The addition of the heat shield 12 makes the vehicle underbody shield assembly 10 a two-part assembly. This increases material costs and manufacturing costs of the vehicle underbody shield assembly 10 because a separate manufacturing step of attaching the heat shield 12 to the fibrous mat 11 with adhesive is required. The heat shield 12 also gives the vehicle underbody shield assembly 10 a greater total thickness 15 and increased weight. For example, the fibrous mat 11 typically weighs approximately 2,000 grams per square meter (gsm or g/m$^2$) and the heat shield 12 typically weighs approximately 900 grams per square meter (gsm or g/m$^2$) giving the vehicle underbody shield assembly 10 a total weight of approximately 2,900 grams per square meter (gsm or g/m$^2$).

In addition, the fibrous material 13 used in the fibrous mat 11 typically has poor rigidity, requiring the vehicle underbody shield assembly 10 to have a large number of closely spaced attachment points 16 for use in securing the vehicle underbody shield assembly 10 to the vehicle. Because typical fasteners (not shown) easily pull-though the fibrous material 13 of the fibrous mat 11, each of the attachment points 16 typically includes a metal grommet 17 to address the fastener pull-through problem, further increasing the material costs, manufacturing costs, and weight of the vehicle underbody shield assembly 10. Also, due to the poor rigidity of the fibrous material 13 of the fibrous mat 11, vehicles often have separate brackets or other support structure (not shown) for use in securing the vehicle underbody shield assembly 10 to the vehicle. These extra components further increase weight, complexity, and cost. Finally, the fibrous material 13 of the fibrous mat 11 tends to absorb water, further increasing weight.

With reference to FIGS. 2-6, the improved fibrous vehicle underbody shield 20 of the subject disclosure is illustrated. The fibrous vehicle underbody shield 20 includes a binderless core 22 that is made of a non-woven fibrous material 24. The binderless core 22 defines a first surface 26 and a second surface 28 of the fibrous vehicle underbody shield 20. The second surface 28 is arranged opposite the first surface 26 such that the first and second surfaces 26, 28 are separated by a final product thickness 30. Stated another way, the second surface 28 is spaced from the first surface 26 by the final product thickness 30. The final product thickness 30 is measured between the first and second surfaces 26, 28 after the fibrous vehicle underbody shield 20 has been molded into shape. By way of example and without limitation, the final product thickness 30 may range from 1.5 millimeters (mm) to 8.0 millimeters (mm).

The fibrous vehicle underbody shield 20 has the form of a final molded part as distinguished from a roll of sheet-like material. In use, the fibrous vehicle underbody shield 20 may be installed beneath at least a portion of a vehicle (not shown). There are a large number of different locations of the vehicle which may be equipped with the fibrous vehicle underbody shield 20 disclosed herein. By way of example and without limitation, the fibrous vehicle underbody shield 20 may be installed beneath an engine compartment, transmission tunnel, or other chassis portions of the vehicle. When installed in these vehicle locations, the fibrous vehicle underbody shield 20 may alternatively be referred to as an underbody aero-shield. In another non-limiting example, the fibrous vehicle underbody shield 20 may be installed between the body and wheels of the vehicle. When installed in these vehicle locations, the fibrous vehicle underbody shield 20 may alternatively be referred to as a wheel well liner. Regardless of the location, when the fibrous vehicle underbody shield 20 is installed on or in the vehicle, the first surface 26 of the fibrous vehicle underbody shield 20 generally faces the vehicle and the second surface 28 of the fibrous vehicle underbody shield 20 faces away from the vehicle and towards the road and/or wheels.

Figure 6:
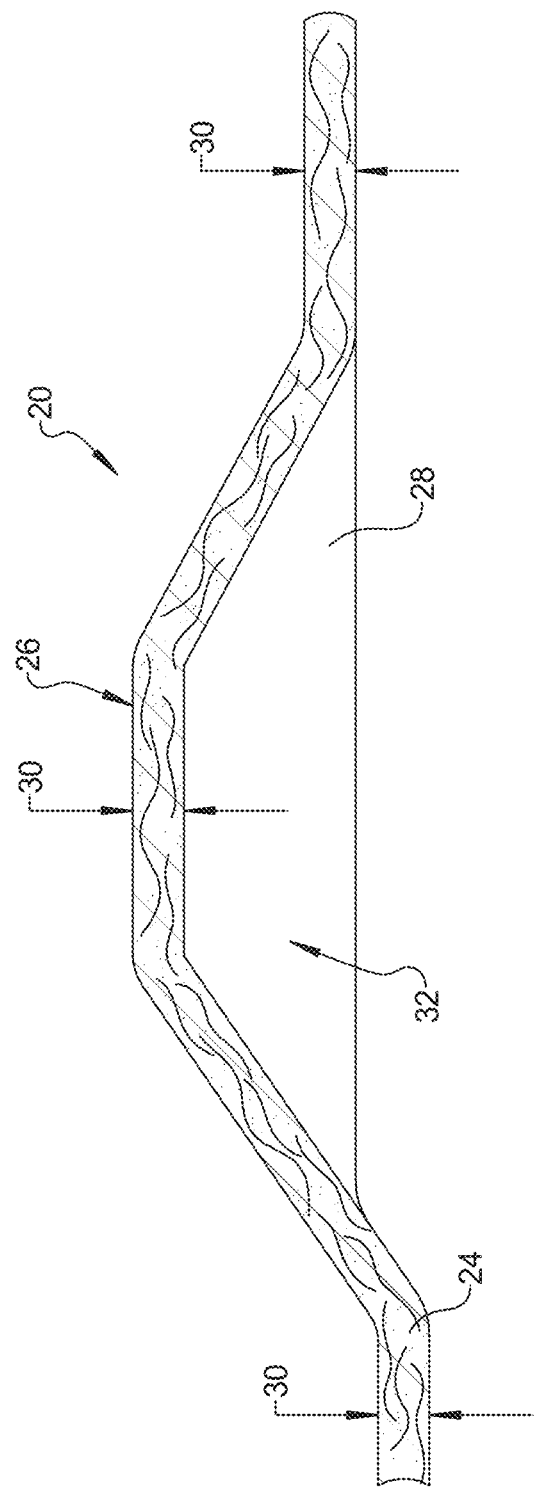
FIG. 6 is a partial, side cross-sectional view of the exemplary fibrous vehicle underbody shield illustrated in FIG. 2.

The first and second surfaces 26, 28 of the fibrous vehicle underbody shield 20 may include one or more molded contours 32. The one or more molded contours 32 give the first and second surfaces 26, 28 a non-planar shape, as opposed to being flat. The one or more molded contours 32 may or may not define an abrupt transition (i.e. a sharp bend or curve). For example, the one or more molded contours 32 may be present in the form of a gentle curve, particularly where the fibrous vehicle underbody shield 20 is in the form of a wheel well liner. When the first and second surfaces 26, 28 of the fibrous vehicle underbody shield 20 include one or more molded contours 32, the final product thickness 30 may vary in size depending on the location. In other words, the final product thickness 30 may be greater along some areas of the fibrous vehicle underbody shield 20 than along other areas of the fibrous vehicle underbody shield 20. Of course, it should be appreciated that the first and second surfaces 26, 28 of the fibrous vehicle underbody shield 20 could be planar in shape (i.e. flat) and/or the final product thickness 30 could be uniform across the fibrous vehicle underbody shield 20. FIG. 6 illustrates one such configuration, where the final product thickness 30 is uniform across the fibrous vehicle underbody shield 20, including in the region of the molded contour 32.

The non-woven fibrous material 24 forming the binderless core 22 includes a plurality of fibers 34 that are mechanically entangled with each other. When the binderless core 22 is supplied as a raw material, the plurality of fibers 34 in the non-woven fibrous material 24 of the binderless core 22 are not held together by a binder or adhesive. Instead, they are simply held together by mechanical entanglement. It should be appreciated that the non-woven fibrous material 24 of the binderless core 22 may be selected from a wide range of different materials. As a result, the plurality of fibers 34 may be natural fibers, synthetic fibers, or a mixture of natural and synthetic fibers. Regardless of the material(s) used, the binderless core 22 may be selected to have a core weight that ranges from 400 to 2,000 grams per square meter (gsm or g/m$^2$).

The fibrous vehicle underbody shield 20 further includes a latex impregnation 36 that is applied to the binderless core 22. The latex impregnation 36 is disposed on at least one of the first and second surfaces 26, 28 and penetrates the non-woven fibrous material 24 of the binderless core 22 an impregnation distance 38. Although the impregnation distance 38 that the latex impregnation 36 penetrates the non-woven fibrous material 24 of the binderless core 22 may vary, in some of the examples described herein, the impregnation distance 38 equals the final product thickness 30. This means that the latex impregnation 36 penetrates all the way through the non-woven fibrous material 24 of the binderless core 22 such that the latex impregnation 36 is disposed on both of the first and second surfaces 26, 28 of the fibrous vehicle underbody shield 20. Nonetheless, the impregnation distance 38 may be less than the final product thickness 30 and may or may not be uniform across the fibrous vehicle underbody shield 20. By way of example and without limitation, the impregnation distance 38 may be more than 50 percent (%) and less than 100 percent (%) of the final product thickness 30 at any given location along the fibrous vehicle underbody shield 20. Where the impregnation distance 38 is less than the final product thickness 30, at least part of the binderless core 22 is free of the latex impregnation 36, which can provide a fibrous vehicle underbody shield 20 with different characteristics (e.g. rigidity) than one where the impregnation distance 38 equals the final product thickness 30. Where the impregnation distance 38 is less than the final product thickness 30, the latex impregnation 36 may be present on the first surface 26 and not on the second surface 28, on the second surface 28 and not on the first surface 26, or on both the first and second surfaces 26, 28 of the fibrous vehicle underbody shield 20. In accordance with this last configuration, the impregnation distance 38 is a sum of the penetration depth of the latex impregnation 36 from the first surface 26 and the penetration depth of the latex impregnation 36 from the second surface 28 such that there is a portion in the middle of the binderless core 22 where the latex impregnation 36 is not present.

The latex impregnation 36 may be selected from a variety of latex materials. By way of example and without limitation, the latex impregnation 36 may be selected from a group of thermoset water based acrylics or a group of thermoplastic water based acrylics. More particularly, the latex impregnation 36 may be comprised of acrylic co-polymer. Optionally, the latex impregnation 36 may be foamed, which can increase the impregnation distance 38 of the latex impregnation 36. The latex impregnation 36 has an applied weight that ranges from 20 to 50 percent (%) of the core weight. Advantageously, the latex impregnation 36 stiffens the non-woven fibrous material 24 of the binderless core 22, increases heat resistance, and decreases water absorption. These are all important characteristics of vehicle underbody shields, whether they be underbody aero-shields, wheel well liners, or installed along another area of the vehicle. In use, the first surface 26 of the fibrous vehicle underbody shield 20 faces the vehicle and therefore is often subject to high temperatures produced by the engine, exhaust system, and other vehicle components. The latex impregnation 36 makes the fibrous vehicle underbody shield 20 more resistant to heat induced warping or droop, allows the fibrous vehicle underbody shield 20 to be used in applications with operating temperatures of up to 200 degrees Celsius (° C.), and allows the fibrous vehicle underbody shield 20 to meet FMVSS-302 flammability standards for self-extinguishing materials. When in use, the second surface 28 of the fibrous vehicle underbody shield 20 may be exposed to the external environment, including wind and water. In addition, road debris, curbs, and other solid objects may impact the second surface 28 of the fibrous vehicle underbody shield 20. The latex impregnation 36 stiffens and at least partially seals the non-woven fibrous material 24 of the binderless core 22 so that the fibrous vehicle underbody shield 20 is more durable, is more resistant to bending and breaking, and has less of a tendency to soak up and retain liquids such as water, fuel, coolant, transmission fluid, or oil.

In accordance with one exemplary embodiment, the non-woven fibrous material 24 is a combination of synthetic fibers, such as regenerated polyethylene terephthalate (PET), and fiberglass. More specifically, the non-woven fibrous material 24 of the binderless core 22 may contain 50 to 75 percent (%) regenerated PET and 25 to 50 percent (%) fiberglass by weight and may have a core bulk density that ranges from 0.1 grams per cubic centimeter (g/cc or g/cm$^3$) to 0.8 grams per cubic centimeter (g/cc or g/cm$^3$). In accordance with this example, the core weight of the binderless core 22 remains within the range of 400 to 2,000 grams per square meter (gsm or g/m$^2$) and the applied weight of the latex impregnation 36 remains within the range of 20 to 50 percent of the core weight. This gives the non-woven fibrous material 24 of the binderless core 22 a finished product bulk density that ranges from 0.21 to 1.06 grams per cubic centimeter (g/cc or g/cm$^3$) after the latex impregnation 36 has been applied. The inventors have found a binderless core 22 containing 65 percent (%) regenerated PET and 35 percent (%) fiberglass by weight to be preferable. The combination of the binderless core 22 and the latex impregnation 36 gives the fibrous vehicle underbody shield 20 an unconsolidated flex modulus (at a bulk density of 0.35 grams per cubic centimeter) that is greater than 350 megapascal (MPa), a consolidated flex modulus (at a bulk density of 0.56 grams per cubic centimeter) that is greater than 1,000 megapascal (MPa), a high speed impact strength that is greater than 3.0 Joules (J), and a breaking force that is greater than 500 Newtons (N).

The plurality of fibers 34 of the non-woven fibrous material 24 has a coating that allows the latex in the latex impregnation 36 to adhere to the plurality of fibers 34. As a result, the latex impregnation 36 mechanically strengthens the binderless core 22 by mechanically linking the plurality of fibers 34 with one another. In this way, the coating acts similar to a paint primer because it helps the latex impregnation 36 stick to the plurality of fibers 34 in the non-woven fibrous material 24 of the binderless core 22. The coating may completely encapsulate each of the fibers 34 in the non-woven fibrous material 24 or, alternatively, may coat only a portion of any given fiber of the plurality of fibers 34. As noted above, the non-woven fibrous material 24 may be a combination of regenerated polyethylene terephthalate (PET) and fiberglass. The coating disclosed herein may be applied to only the plurality of fibers 34 of the regenerated PET, the plurality of fibers 34 of the fiberglass, or both. Although the coating may be applied to the plurality of fibers 34 in numerous ways, one exemplary manufacturing process is known in the industry as applying a spin finish to the non-woven fibrous material 24. Spin finishing typically involves spraying the coating into an air-filled tube through which the fibers 34 are blown. Unlike conventional spin finishes, which break down at temperatures of approximately 160 degrees Celsius (° C.), the coating applied to the plurality of fibers 34 in the fibrous vehicle underbody shield 20 disclosed herein withstands a heat exposure of at least 200 degrees Celsius (° C.). In one example, the coating may be a fiber finish containing an emulsion of fatty acid(s) that is chemically compatible to bond to regenerated PET, fiberglass, and latex. By way of example and without limitation, one such emulsion suitable for use in this application is sold under the tradename LUROC. As will be explained below, testing has shown that such a coating improves sag test performance and Gardner impact test performance of the fibrous vehicle underbody shield 20.

In another exemplary embodiment, the non-woven fibrous material 24 of the binderless core 22 includes a combination of regenerated PET and natural fibers. More specifically, the non-woven fibrous material 24 of the binderless core 22 may contain 50 to 75 percent (%) regenerated PET and 25 to 50 percent (%) natural fibers by weight and may have a core bulk density that ranges from 0.1 grams per cubic centimeter (g/cc or g/cm$^3$) to 0.8 grams per cubic centimeter (g/cc or g/cm$^3$). The natural fibers may more particularly be hemp fibers such as kenaf fibers. In accordance with this example, the core weight of the binderless core 22 remains within the range of 400 to 2,000 grams per square meter (gsm or g/m$^2$) and the applied weight of the latex impregnation 36 remains within the range of 20 to 50 percent of the core weight. This gives the non-woven fibrous material 24 a finished product bulk density that ranges from 0.21 to 1.06 grams per cubic centimeter (g/cc or g/cm$^3$). The inventors have found a binderless core 22 containing 65 percent (%) regenerated PET and 35 percent (%) natural fibers by weight to be preferable. The combination of the binderless core 22 and the latex impregnation 36 gives the fibrous vehicle underbody shield 20 an unconsolidated flex modulus (at a bulk density of 0.35 grams per cubic centimeter) that is greater than 250 megapascal (MPa), a consolidated flex modulus (at a bulk density of 0.56 grams per cubic centimeter) that is greater than 500 megapascal (MPa), a high speed impact strength that is greater than 0.5 Joules (J), and a breaking force that is greater than 500 Newtons (N).

The unconsolidated flex modulus, consolidated flex modulus, high speed impact strength, and breaking force may be measured/tested in accordance with conventional methods known in the art. For example, unconsolidated flex modulus may be measured by ISO 178 where the binderless core has a core weight of 1,400 grams (g) and a thickness of 4.0 millimeters (mm) to yield a bulk density of 0.35 grams per cubic centimeter (g/cc or g/cm$^3$). This value is useful for evaluating the rigidity of the fibrous vehicle underbody shield 20. Similarly, consolidated flex modulus may be measured by ISO 178 where the binderless core has a core weight of 1,400 grams (g) and a thickness of 2.0 millimeters (mm) to yield a bulk density of 0.56 grams per cubic centimeter (g/cc or g/cm$^3$). This value is useful for evaluating the rigidity of the fibrous vehicle underbody shield 20. High speed impact strength may be measured using a dart impact test procedure (ISO 6603-2), where a dart is shot at the fibrous vehicle underbody shield 20 at a velocity of 2.2 meters per second (m/s) at room temperature and at a temperature of minus 30 degrees Celsius (−30° C.). This value is useful for evaluating the fibrous vehicle underbody shield's ability to resist cracking and puncture as a result of high speed impacts with smaller foreign objects such as road debris and gravel. Breaking force may be measured by ASTM D5034. This value is useful for evaluating the strength of the fibrous vehicle underbody shield 20 and its ability to resist fractures as a result of impacts with solid objects such as curbs. These tests are done when the fibrous vehicle underbody shield 20 is dry and at an ambient temperature of 22 degrees Celsius (° C.).

Figure 4:
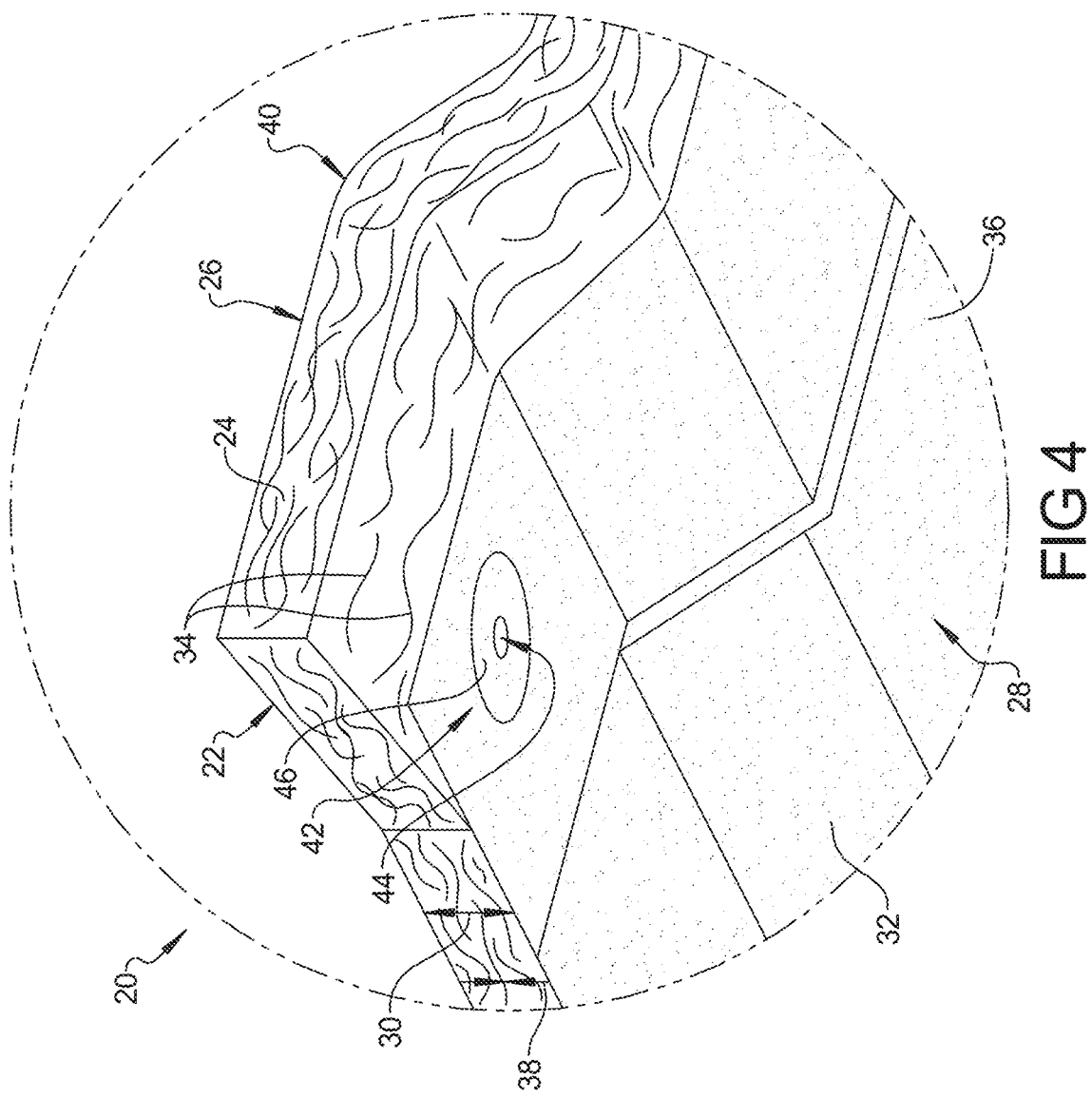
FIG. 4 is an enlarged perspective view of a corner of the exemplary fibrous vehicle underbody shield illustrated in FIG. 3 showing an exemplary attachment location.
Figure 5:
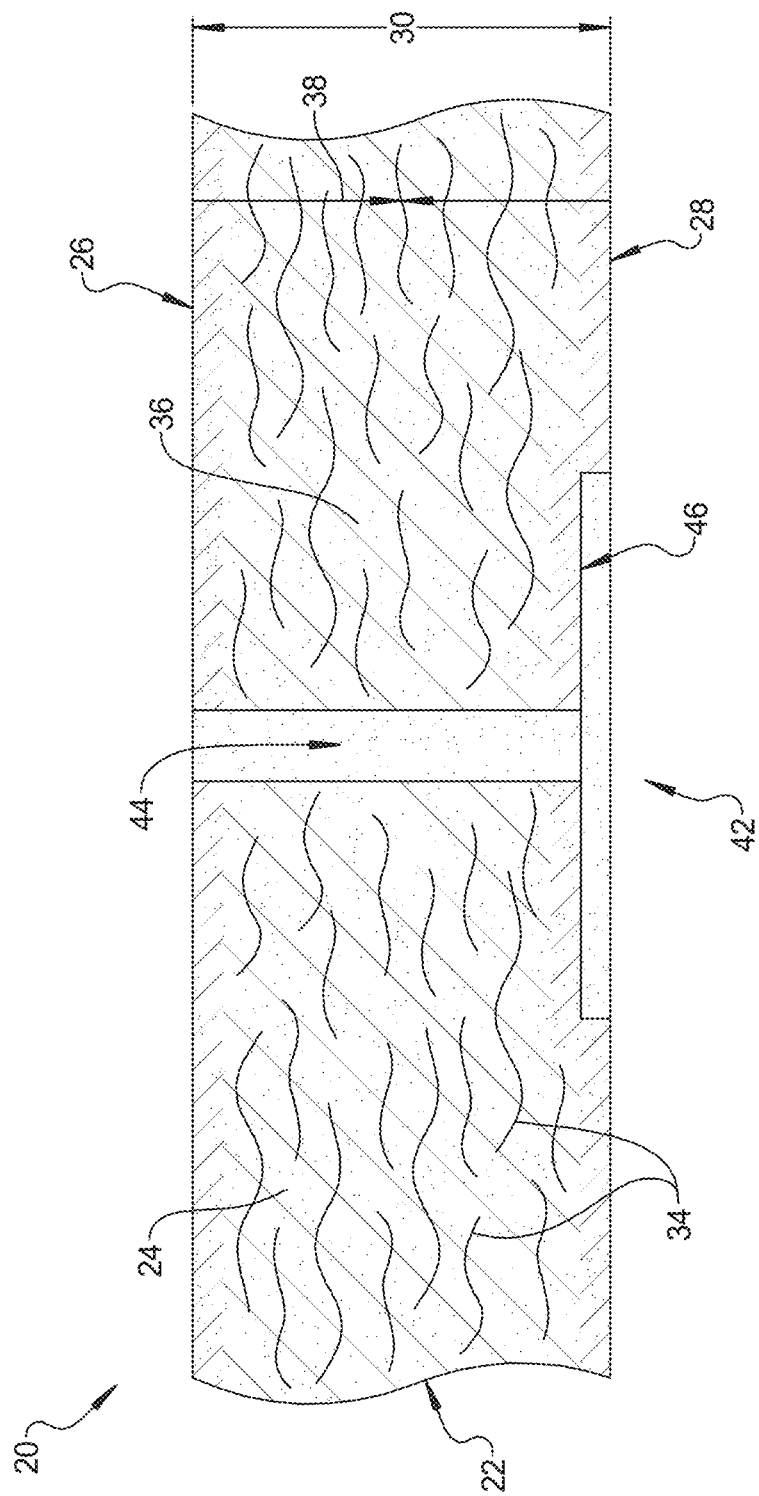
FIG. 5 is a side cross-sectional view of the corner of the exemplary fibrous vehicle underbody shield illustrated in FIG. 4, taken at the attachment location.

As best seen in FIG. 4, the binderless core 22 may optionally include an untreated edge 40 that is free of the latex impregnation 36. The untreated edge 40 of the binderless core 22 is more flexible than the area of the binderless core 22 that is treated with the latex impregnation 36. When the fibrous vehicle underbody shield 20 is installed on or in the vehicle, the flexibility of the untreated edge 40 can enhance the mating and sealing of the fibrous vehicle underbody shield 20 against the vehicle. The fibrous vehicle underbody shield 20 may also include one or more attachment locations 42. Each of the attachment locations 42 includes a throughbore 44 and a flange 46. As best seen in FIGS. 4 and 5, the throughbore 44 extends through the binderless core 22 from the first surface 26 to the second surface 28 and is sized to receive a fastener (not shown). At the flange 46, the non-woven fibrous material 24 of the binderless core 22 is compressed such that the final product thickness 30 at the flange 46 is reduced. By way of example and without limitation, the final product thickness 30 at the flange 46 may range from 1.5 millimeters (mm) to 8 millimeters (mm). The latex impregnation 36 is co-extensive with the flange 46.

In the example where the non-woven fibrous material 24 of the binderless core 22 is a combination of regenerated PET and fiberglass, the highly compressed state of the binderless core 22 in combination with the latex impregnation 36 gives each of the attachment locations 42 an in-plane bolt pull-through strength that is greater than 165 Newtons (N) and an out-of-plane bolt pull-through strength that is greater than 275 Newtons (N). In the example where the non-woven fibrous material 24 of the binderless core 22 is a combination of PET and natural fibers, the combination of the highly compressed state of the binderless core 22 and the latex impregnation 36 gives each of the attachment locations 42 an in-plane bolt pull-through strength that is greater than 150 Newtons (N) and an out-of-plane bolt pull-through strength that is greater than 250 Newtons (N). The in-plane and out-of-plane bolt pull-through strength of the attachment locations 42 may be measured/tested in accordance with conventional methods known in the art. For example, the in-plane bolt pull-through strength may be measured by FLTM BA 116-01, which calls for: inserting a M6-1.0 120 millimeters (mm) long fastener into the throughbore 44 of the attachment location 42 being tested, retaining the fibrous vehicle underbody shield 20 in place with clamps, and applying an increasing tensile force on the fastener in a direction that is perpendicular to the flange 46 of the attachment location 42 until the fastener pulls completely through the flange 46. The tensile force is increased or decreased during the test so that the fastener moves at a constant rate of 50 millimeters per minute (mm/min). The out-of-plane bolt pull-through strength may also be measured by FLTM BA 116-01, which calls for: inserting a M6-1.0 120 millimeters (mm) long fastener into the throughbore 44 of the attachment location 42 being tested, retaining the fibrous vehicle underbody shield 20 in place with clamps, and applying an increasing shear force on the fastener in a direction that is parallel to the flange 46 of the attachment location 42 until the fastener pulls completely through the flange 46. The shear force is increased or decreased during the test so that the fastener moves at a constant rate of 50 millimeters per minute (mm/min). Both tests are done when the fibrous vehicle underbody shield 20 is dry and at an ambient temperature of 22 degrees Celsius (° C.). The values for the in-plane and out-of-plane bolt pull-through strengths are useful for evaluating the strength of the attachment locations 42 of the fibrous vehicle underbody shield 20. The greater these values are, the less likely it will be for the fibrous vehicle underbody shield 20 to tear away from the vehicle during high speed vehicle operation or where the fibrous vehicle underbody shield 20 impacts a solid object such as a curb or during off-road vehicle operation. It should therefore be appreciated that the fibrous vehicle underbody shield 20 disclosed herein has sufficient bolt pull through strength that the need for the grommets 17 shown in FIG. 1 is eliminated. This reduces weight, the cost of materials, and manufacturing costs because the manufacturing step of adding grommets is eliminated. Additionally, the absence of the metal grommets 17 and heat shield 12 shown in FIG. 1 makes the fibrous vehicle underbody shield 20 of the subject disclosure more environmentally friendly and easier to recycle.

Figure 7:
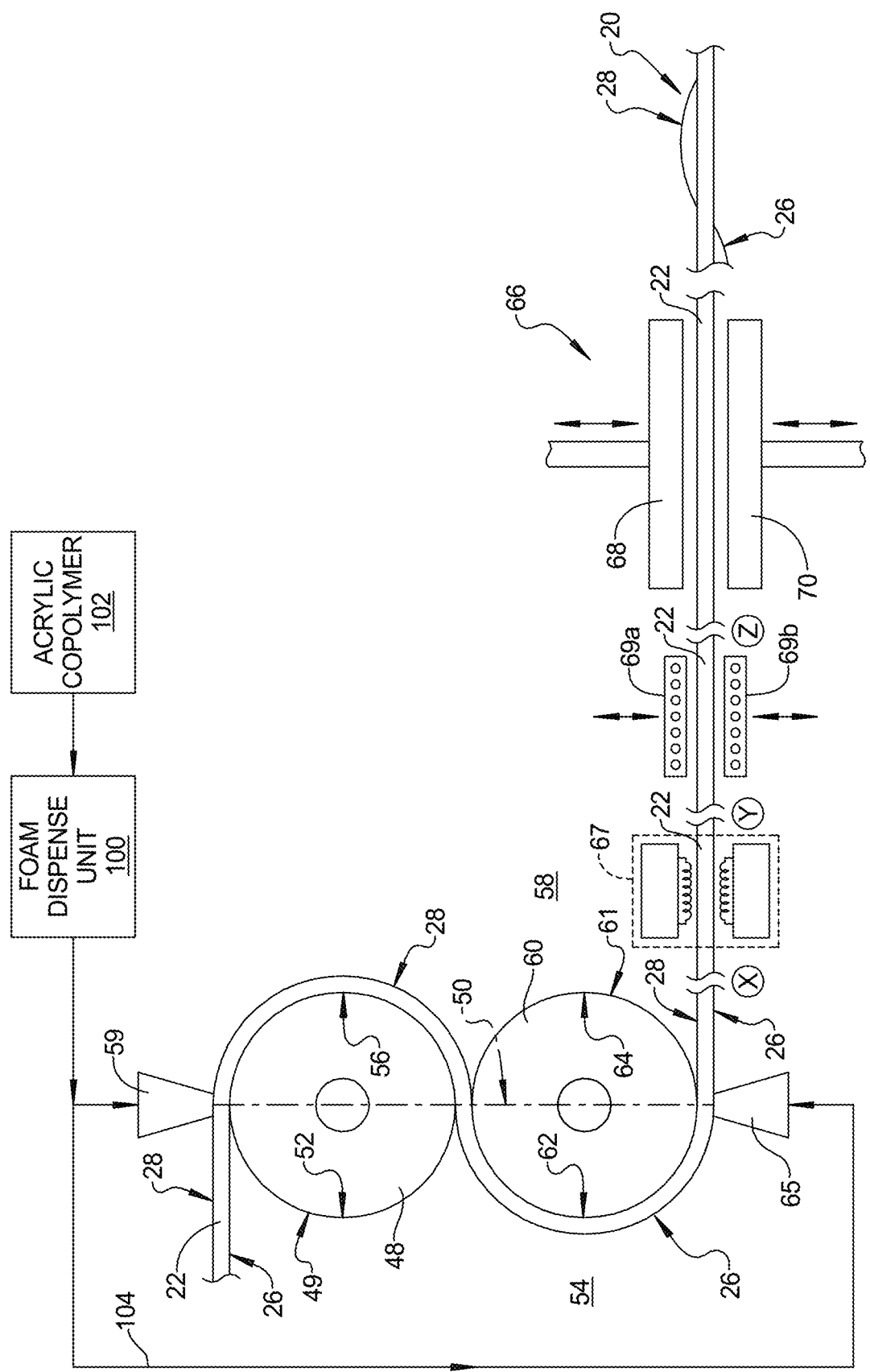
FIG. 7 is a side elevation view illustrating an exemplary manufacturing process for making the exemplary fibrous vehicle underbody shield illustrated in FIG. 2.

The subject disclosure also provides for a method of manufacturing fibrous vehicle underbody shields 20 such as those described above. The various steps of the method are illustrated in FIG. 7. The method includes the step of feeding the binderless core 22 of non-woven fibrous material 24 to a first roller 48. The first roller 48 has a first outer cylindrical surface 49 that is bisected by a vertical plane 50 to define a first semi-cylinder 52 on an input side 54 of the vertical plane 50 and a second semi-cylinder 56 on an output side 58 of the vertical plane 50. It should be appreciated that in FIG. 7, the binderless core 22 is fed from the input side 54 of the vertical plane 50 and the fibrous vehicle underbody shield 20 exits as a final product on the output side 58 of the vertical plane 50. The method proceeds with the step of passing the binderless core 22 over the first roller 48 such that the first surface 26 of the binderless core 22 contacts at least part of the first outer cylindrical surface 49 of the first roller 48. More specifically, this step of the method may include passing the binderless core 22 over the first roller 48 such that the first surface 26 of the binderless core 22 contacts only the second semi-cylinder 56 of the first roller 48. The method also includes the step of foaming latex 59 onto the second surface 28 of the binderless core 22 that is opposite the first surface 26 while the first surface 26 of the binderless core 22 remains in contact with at least part of the first outer cylindrical surface 49 of the first roller 48. More particularly, this foaming step may include foaming latex 59 onto the second surface 28 of the binderless core 22 while the first surface 26 of the binderless core 22 remains in contact with the second semi-cylinder 56 of the first roller 48. Although the equipment used to carry out the foaming steps may vary without departing from the scope of the method described herein, a foam dispense unit 100 may be supplied with an acrylic copolymer 102. The foam dispense unit 100 foams the acrylic copolymer 102, which is transported to the first and second rollers 48, 60 via a conduit 104. At each of the first and second rollers 48, 60, the foamed acrylic copolymer 102 is dispensed onto the binderless core 22 as latex 59, 65.

The method may proceed with the step of feeding the binderless core 22 to a second roller 60. The second roller 60 has a second outer cylindrical surface 61. The second roller 60 may be aligned with the vertical plane 50 such that the vertical plane 50 bisects the second outer cylindrical surface 61 of the second roller 60 to define a third semi-cylinder 62 on the input side 54 of the vertical plane 50 and a fourth semi-cylinder 64 on the output side 58 of the vertical plane 50. The method includes the step of passing the binderless core 22 over the second roller 60 such that the second surface 28 of the binderless core 22 contacts at least part of the second outer cylindrical surface 61 of the second roller 60. More specifically, this step may include passing the binderless core 22 over the second roller 60 such that the second surface 28 of the binderless core 22 contacts only the third semi-cylinder 62 of the second roller 60. The method further includes the step of foaming latex 65 onto the first surface 26 of the binderless core 22 while the second surface 28 of the binderless core 22 remains in contact with at least part of the second outer cylindrical surface 61 of the second roller 60. More particularly, this foaming step may include foaming latex 65 onto the first surface 26 of the binderless core 22 while the second surface 28 of the binderless core 22 remains in contact with the third semi-cylinder 62 of the second roller 60.

Optionally, the method may include the step of compressing the binderless core 22 between the first and second rollers 48, 60 to decrease the loft of the non-woven fibrous material 24 of the binderless core 22. For example and without limitation, the loft of the non-woven fibrous material 24 of the binderless core 22 may be decreased by 1 millimeter (mm) to 4 millimeters (mm) during this step. After the latex 59, 65 has been foamed into the first and second surfaces 26, 28 of the binderless core 22, the method may optionally proceed with the step of applying heat to the binderless core 22 after the binderless core 22 has been impregnated with latex 59, 65 and before the latex impregnated binderless core 22 is fed to a molding press 66. Heat may be applied in various ways. By way of non-limiting example, the latex impregnated binderless core 22 may be fed into an oven 67. At point X, where the latex impregnated binderless core 22 exits the second roller 60 and before the latex impregnated binderless core 22 is fed into the oven 67, the latex impregnated binderless core 22 typically has a high water content, where the water content is greater than twenty percent (20%) of the weight of the latex impregnated binderless core 22 (i.e. the water in the latex impregnated binderless core 22 weighs more than twenty percent of the total weight of the latex impregnated binderless core 22). The heat applied to the latex impregnated binderless core 22 in the oven 67 reduces the water content of the latex impregnated binderless core 22 to a range where the water content equals five to zero percent (5-0%) of the weight of the latex impregnated binderless core 22. Accordingly, when the latex impregnated binderless core 22 exits the oven 67 at point Y, the water content of the latex impregnated binderless core 22 equals five to zero percent (5-0%).

The method may include the step of preheating the latex impregnated binderless core 22 with a water content ranging from five to zero percent (5-0%) before feeding the latex impregnated binderless core 22 to the molding press 66. Again, heat may be applied in various ways. In one example, the preheating step may include applying heat to the latex impregnated binderless core with one or more platens 69a, 69b. The platens 69a, 69b are moved into contact with the first and second surfaces 26, 28 of the latex impregnated binderless core 22. One or both of the platens 69a, 69b are heated and preferably have a surface temperature ranging from 250 to 290 degrees Fahrenheit (° F.). Applying heat within this temperature range softens the latex 59, 65 in the binderless core 22 without causing cross-linking of the latex molecules. The object of the preheating step is to soften the latex impregnated binderless core 22 before it enters the molding press 66. Heat above 290 degrees Fahrenheit (° F.) causes significant cross-linking of the latex molecules and makes the latex 59, 65 brittle, which is undesirable because it can cause the latex impregnated binderless core 22 to break (i.e. fracture) during the molding step. A transfer time between the preheating step and the molding step (i.e. the time between when the latex impregnated binderless core 22 exits the platens 69a, 69b and enters the molding press 66) of eight to ten seconds (8-10 sec) is preferred. Longer transfer times allow the latex impregnated binderless core 22 to cool before entering the molding press 66, thus reducing the effectiveness of the preheating step. When the latex impregnated binderless core 22 exits the platens 69a, 69b at point Z, the latex impregnated binderless core 22 has a water content that is less than five percent (5%) of the weight of the latex impregnated binderless core 22 and may equal or be approximately zero percent (0%).

The method continues with the step of feeding the binderless core 22 to the molding press 66. The molding press 66 performs the method step of compressing at least one segment of the binderless core 22 under heat to create the one or more molded contours 32 of the fibrous vehicle underbody shield 20. More specifically, the molding press 66 may include a first die 68 and a second die 70 that compress the at least one segment of the binderless core 22. The molding step also gives the fibrous vehicle underbody shield 20 the final product thickness 30. The method then continues with the step of removing a finished molded fibrous vehicle underbody shield 20 from the molding press 66. Optionally, the one or more attachment locations 42 of the fibrous vehicle underbody shield 20 may be created by the molding step. The method may therefore further include the step of forming the throughbore 44 in each of the attachment locations 42, which are sized to receive fasteners (not shown).

It should be appreciated that the step of heating the latex impregnated binderless core 22 in the oven 67 and/or preheating the latex impregnated binderless core 22 with the platens 69a, 69b may be eliminated; however, there are drawbacks to that approach. The latex impregnated binderless core 22 can be molded in the molding press 66 without preheating if the water content is greater than ten percent (10%) of the weight of the latex impregnated binderless core 22. The latex impregnated binderless core 22 becomes more brittle when the water content is reduced. When the water content of the latex impregnated binderless core 22 is in the range of five to zero percent (5-0%) of the weight of the latex impregnated binderless core 22, the latex impregnated binderless core 22 cannot be molded in the molding press 66 unless the preheating step is performed. Until the preheating step is performed to soften the latex 59, 65, the latex impregnated binderless core 22 with a water content in the five to zero percent (5-0%) range is too brittle and has a tendency to break in the mold. When the latex impregnated binderless core 22 has a water content of greater than ten percent (10%), preheating is unnecessary, but the molding step takes longer (requires a longer cycle time) because the water in the latex impregnated binderless core 22 absorbs some of the heat until it evaporates out of the latex impregnated binderless core 22. Also, steam is created when the water evaporates out of the latex impregnated binderless core 22, which sometimes requires "burping" of the molding press 66 where the first and second dies 68, 70 of the molding press 66 are opened slightly during the molding step to let the steam escape. This further increases the cycle time of the molding step. By heating the latex impregnated binderless core 22 in the oven 67 until a water content of in the five to zero percent (5-0%) range is achieved and then preheating the latex impregnated binderless core 22 prior to molding, the inventors have been able to eliminate the need to "burp" the molding press 66 and have reduced the cycle time of the molding step from approximately seventy five seconds (75 sec) down to approximately forty five seconds (45 sec). This time savings results in a method with significantly higher output.

Other advantages are realized by heating the latex impregnated binderless core 22 in the oven 67 until a water content of in the five to zero percent (5-0%) range is achieved and then preheating the latex impregnated binderless core 22 prior to molding. The molding step is not always performed immediately after the latex 59, 65 is applied to the binderless core 22 or immediately after the latex impregnated binderless core 22 exits the oven 67. For example, the latex impregnated binderless core 22 may be stored or shipped prior to molding. If preheating is not used, the water content must be kept above ten percent (10%) of the weight of the latex impregnated binderless core 22, otherwise the latex impregnated binderless core 22 will become too brittle for molding. To prevent the latex impregnated binderless core 22 from drying out (i.e. to prevent the water content from falling below ten percent), the latex impregnated binderless core 22 must be bagged to seal in the moisture, and even then, the bagged latex impregnated binderless core 22 will have a limited shelf life. By using a latex impregnated binderless core 22 with a water content ranging from five to zero percent (5-0%) in combination with preheating, the need to bag the latex impregnated binderless core 22 is eliminated and shelf life is no longer a limiting factor.

In accordance with the method disclosed herein, various materials may be selected to give the fibrous vehicle underbody shield 20 certain desirable properties. For example, the method may include the step of selecting the non-woven fibrous material 24 of the binderless core 22 from a combination of regenerated PET and fiberglass that contains 50 to 75 percent (%) regenerated PET and 25 to 50 percent (%) fiberglass by weight and that has a core bulk density within the ranges of 0.1 grams per cubic centimeter (g/cc or g/cm$^3$) to 0.8 grams per cubic centimeter (g/cc or g/cm$^3$). Alternatively, the method may include the step of selecting the non-woven fibrous material 24 of the binderless core 22 from a combination of regenerated PET and natural fibers that contains 50 to 75 percent (%) regenerated PET and 25 to 50 percent (%) natural fibers by weight and that contains a core bulk density within the ranges of 0.1 grams per cubic centimeter (g/cc or g/cm$^3$) to 0.8 grams per cubic centimeter (g/cc or g/cm$^3$).

Regardless of the combination of materials used for the binderless core 22, the method may include the step of selecting the binderless core 22 to have a core weight within the range of 400 to 2,000 grams per square meter (gsm or g/m$^2$). The method may also include selecting a flow rate of the latex 59, 65 during the foaming steps to give the latex 59, 65 an applied weight that ranges from 20 to 50 percent (%) of the core weight in the finished molded fibrous vehicle underbody shield 20. Although a variety of different latex materials may be used without departing from the scope of the subject disclosure, the method may include the step of selecting the latex 59, 65 from a group of thermoset water based acrylics or from a group of thermoplastic water based acrylics. Additionally, the method may optionally include the step of applying a coating to the plurality of fibers 34 of the non-woven fibrous material 24 that adheres to the latex 59, 65 and withstands a heat exposure of at least 200 degrees Celsius (° C.).

As explained above, in accordance with one aspect of the subject disclosure, the plurality of fibers 34 of the non-woven fibrous material 24 have a coating that bonds with the latex of the latex impregnation 36 and withstands a heat exposure of at least 200 degrees Celsius (° C.). Table I set forth below illustrates the effects of this coating on sag test performance and Gardner impact test performance:

TABLE I

|  | SAMPLE A Binderless Core with 20% fiberglass, 80% PET, and latex impregnation | SAMPLE B Binderless Core with 40% fiberglass, 60% PET, and latex impregnation | SAMPLE C Binderless Core with 35% fiberglass, 65% PET, latex impregnation, and new coating |
|---|---|---|---|
| Sag Test After 200 C. Heat Exposure | 4.4 mm | 2.8 mm | 1.0 mm |
| Gardner Impact Test Before Heat Exposure | 8.8 J | 8.8 J | 7.4 J |
| Gardner Impact Test After 200 C. Heat Exposure | 2.9 J | 3.9 J | 4.9 J |
| Percent Drop in Gardner Impact Test Due to 200 C. Heat Exposure | 67% | 56% | 34% |

In Table I (above), the results of several sag tests and Gardner impact tests are shown. The sag test involves subjecting a sample to a heat of 200 degrees Celsius (° C.) for 48 hours and then measuring the distance, in millimeters (mm), the sample drops under the influence of gravity when held in a test stand. For the sag tests, a smaller value in millimeters (mm) is generally considered better for vehicle underbody shields. The Gardner impact tests were carried out using ASTM D5628-10, but the procedure was modified slightly to ensure repeatability. Instead of subjectively determining when penetration occurred, a predetermined penetration depth was set to equal the thickness of the sample being tested. The units for the Gardner impact tests were recorded in Joules (J). The Gardner impact tests were performed twice for each sample, once before the sample had been exposed to heat and once after the sample had been exposed to a heat of 200 degrees Celsius (° C.) for 48 hours. For the Gardner impact tests, a larger value in Joules (J) is generally considered better for vehicle underbody shields. Accordingly, a lower percentage drop in the Gardner impact test value due to heat exposure is generally considered better for vehicle underbody shields.

The sag tests and the Gardner impact tests were carried out on three samples (Sample A, Sample B, and Sample C), which are representative of different variations of the fibrous vehicle underbody shield 20 disclosed herein. In Sample A, the fibrous vehicle underbody shield 20 included a binderless core 22 having a non-woven fibrous material 24 made of 20 percent fiberglass and 80 percent regenerated PET. Sample A included the latex impregnation 36, but did not have the coating disclosed herein. In Sample B, the fibrous vehicle underbody shield 20 included a binderless core 22 having a non-woven fibrous material 24 made of 40 percent fiberglass and 60 percent regenerated PET. Sample B included the latex impregnation 36, but did not have the coating disclosed herein. In Sample C, the fibrous vehicle underbody shield 20 included a binderless core 22 having a non-woven fibrous material 24 made of 35 percent fiberglass and 65 percent regenerated PET. Sample C included the latex impregnation 36 and the fibers 34 of the regenerated PET were provided with the coating disclosed herein.

The test data shown in Table I illustrates a number of trends. First, the values recorded in the sag test generally decrease (improve) when the percentage of fiberglass in the non-woven fibrous material 24 is increased. Second, the values recorded in the sag test generally decrease (improve) when the coating disclosed herein is applied to the fibers 34 of the regenerated PET in the non-woven fibrous material 24. As the sag test values show, the coating disclosed herein greatly improved the sag test performance of the fibrous vehicle underbody shield 20. Third, the values recorded in the Gardner impact test measured after the 200 degrees Celsius (° C.) heat exposure generally increase (improve) when the percentage of fiberglass in the non-woven fibrous material 24 is increased. Fourth, the values recorded in the Gardner impact test measured after the 200 degrees Celsius (° C.) heat exposure generally increase (improve) when the coating disclosed herein is applied to the fibers 34 of the regenerated PET in the non-woven fibrous material 24. As the Gardner impact test values show, the coating disclosed herein greatly improved the Gardner impact test performance of the fibrous vehicle underbody shield 20 after the samples had been subjected to the 200 degrees Celsius (° C.) heat exposure. Finally, while the percentage of fiberglass in the non-woven fibrous material 24 did not appear to materially impact the Gardner impact test performance of the fibrous vehicle underbody shield 20 before the samples had been subjected to the 200 degrees Celsius (° C.) heat exposure, the addition of the coating to the fibers 34 of the regenerated PET in the non-woven fibrous material 24 did appear to decrease Gardner impact test performance of the fibrous vehicle underbody shield 20 some before the samples had been subjected to the 200 degrees Celsius (° C.) heat exposure. However, this small drawback associated with the addition of the coating is overshadowed by the coating's ability to improve sag test performance and significantly lower the percent drop in the Gardner impact test performance after the sample was subjected to the 200 degrees Celsius (° C.) heat exposure.

Figure 8:
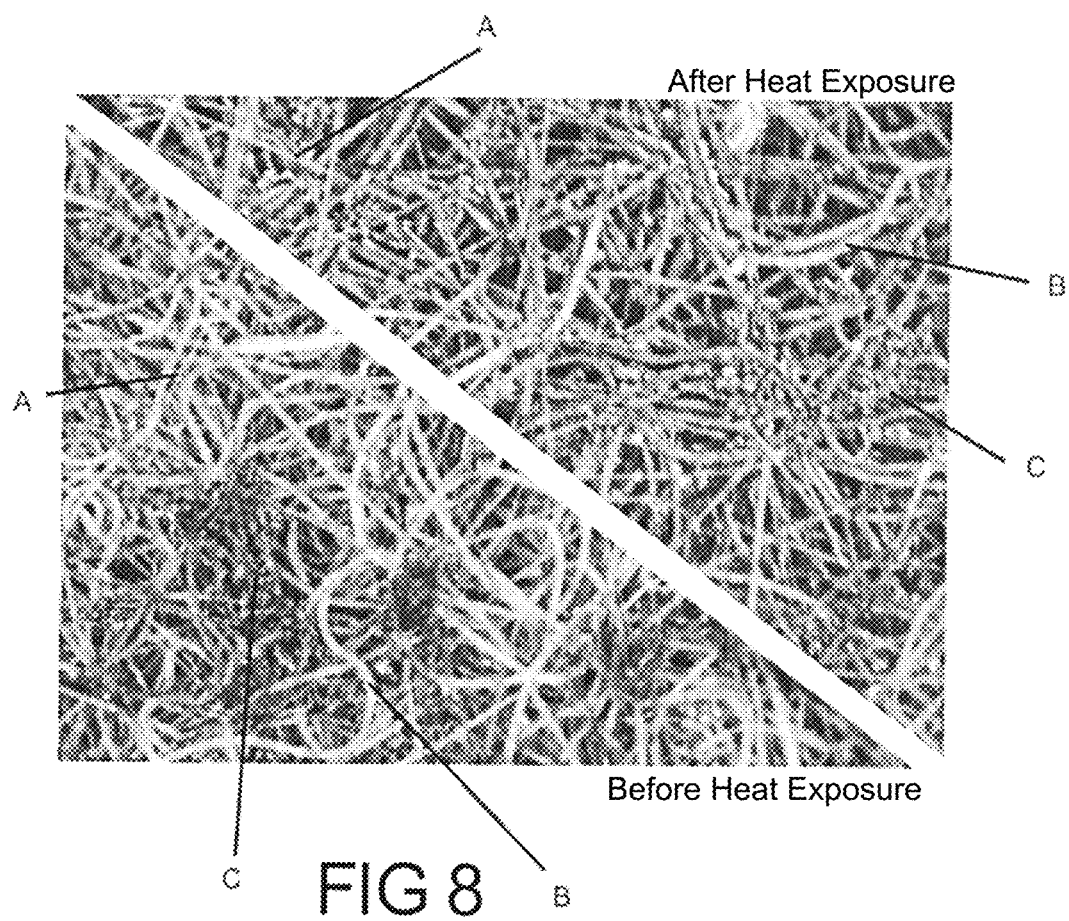
FIG. 8 is an image illustrating the microscopic structure of a sample of the fibrous vehicle underbody shield of FIG. 2 that includes a binderless core with a latex impregnation.
Figure 9:
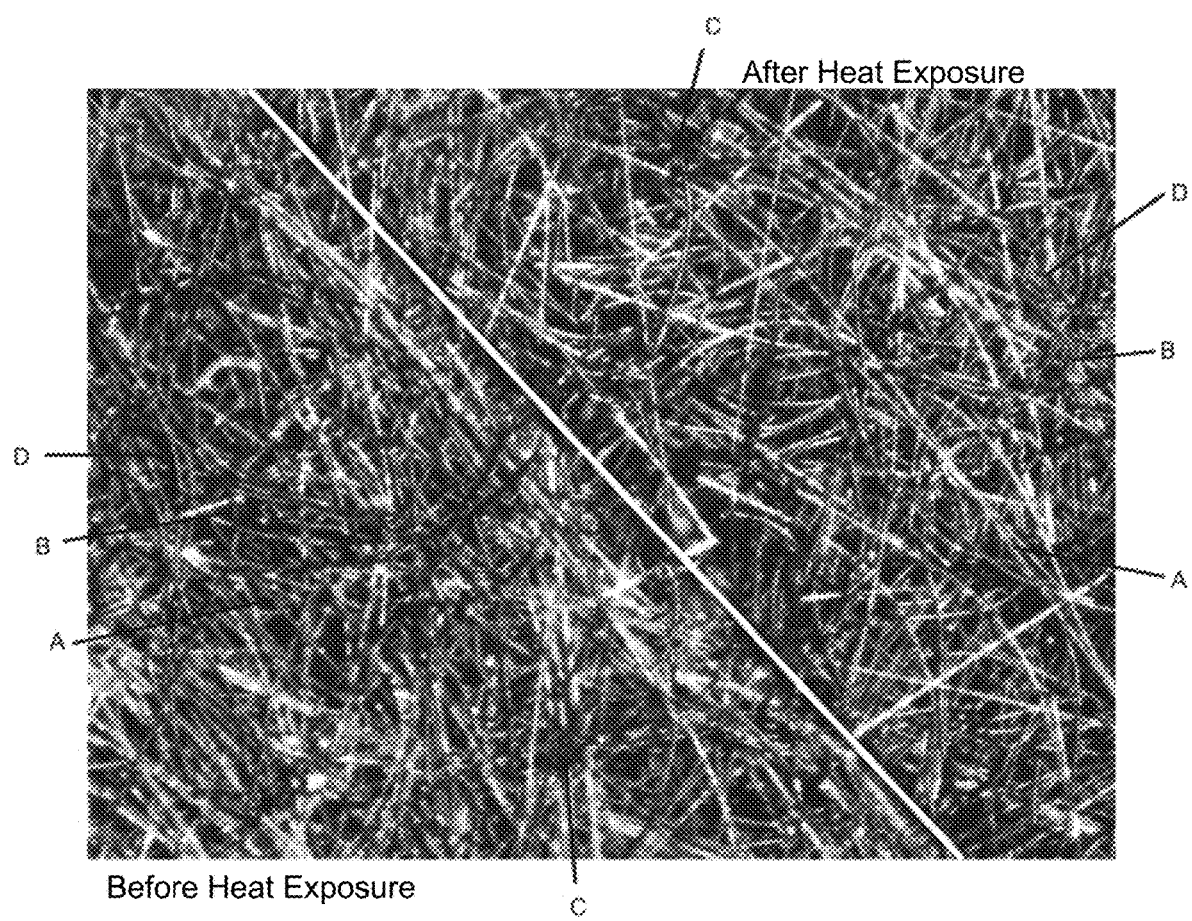
FIG. 9 is an image illustrating the microscopic structure of another sample of the fibrous vehicle underbody shield of FIG. 2 where the binderless core has the latex impregnation and a high temperature coating applied to the plurality of fibers in the binderless core.

The microscope images shown in FIGS. 8 and 9 validate the test results shown in Table I. In both FIGS. 8 and 9, the fiberglass fibers A are the generally straight and thin fibers shown in the split images, the regenerated PET fibers B are the generally curved and thick fibers shown in the split images, and the latex impregnation C is generally shown as globules in the split images.

The split image in FIG. 8 shows the structure of a sample of the fibrous vehicle underbody shield 20 that includes the latex impregnation C, but does not have the coating disclosed herein and shown in FIG. 9 at reference letter D. The bottom left-hand side of the split image shows the structure of the sample before heat exposure, while the top right-hand side of the split image shows the structure of the sample after being subjected to the 200 degrees Celsius (° C.) heat exposure. The top right-hand side of the split image in FIG. 8 shows that the regenerated PET fibers B have darkened after being subjected to a heat of 200 degrees Celsius (° C.) for 48 hours. This darkening of the regenerated PET fibers B illustrates the degrading of the conventional finish that is applied to the regenerated PET fibers B, which begins to degrade at a temperature of approximately 160 degrees Celsius (° C.), thus weakening the bond between the latex impregnation C and the regenerated PET fibers B.

The split image in FIG. 9 shows the structure of a sample of the fibrous vehicle underbody shield 20 that has the latex impregnation C and regenerated PET fibers B with the coating D disclosed herein. The bottom left-hand side of the split image shows the structure of the sample before heat exposure, while the top right-hand side of the split image shows the structure of the sample after being subjected to a heat of 200 degrees Celsius (° C.) for 48 hours. The top right-hand side of the split image in FIG. 9 illustrates that the regenerated PET fibers B show no signs of darkening (i.e. degrading) after being subjected to the heat exposure, indicating that the coating D disclosed herein withstands a heat exposure of at least 200 degrees Celsius (° C.). The top right-hand side of the split image in FIG. 9 also illustrates that the fiberglass fibers A have darkened after being subjected to the heat exposure. This darkening of the fiberglass fibers A illustrates the degrading of the conventional finish that is applied to the fiberglass fibers A, which begins to degrade after the conventional finish that is applied to the regenerated PET fibers B. Accordingly, the coating disclosed herein may also be applied to the fiberglass fibers A to provide greater heat resistance. Through this testing and experimentation, it was determined that the finish on the fiberglass fibers A and especially the regenerated PET fibers B represented a weak link in the non-woven fibrous material 24 because it degrades at considerably lower temperatures than the fibers 34 themselves, thus providing the motivation for the higher temperature coating D disclosed herein.

Many modifications and variations of the present invention are possible in light of the above teachings and may be practiced otherwise than as specifically described while within the scope of the appended claims. These antecedent recitations should be interpreted to cover any combination in which the inventive novelty exercises its utility. With respect to the methods set forth herein, the order of the steps may depart from the order in which they appear without departing from the scope of the present disclosure and the appended method claims. Additionally, various steps of the method may be performed sequentially or simultaneously in time.

What is claimed is:

1. A fibrous vehicle underbody shield comprising:
   a fibrous core of non-woven fibrous material;
   a first surface formed by said fibrous core;
   a second surface formed by said fibrous core opposite said first surface;
   said first and second surfaces being separated by a final product thickness that is measured between said first and second surfaces;
   said first and second surfaces including at least one molded contour that gives the first and second surfaces a non-planar shape;
   said non-woven fibrous material including a plurality of fibers that are mechanically entangled with each other;
   a latex impregnation disposed on at least one of said first and second surfaces that penetrates said non-woven fibrous material of said fibrous core an impregnation distance;
   said plurality of fibers of said non-woven fibrous material having a fiber finish, wherein said fiber finish contains an emulsion of fatty acid that is adhered to said latex and withstands a heat exposure of at least 200 degrees Celsius.

2. The fibrous vehicle underbody shield of claim 1, wherein said non-woven fibrous material of said fibrous core is a material consisting essentially of regenerated PET and fiberglass.

3. The fibrous vehicle underbody shield of claim 2, wherein said fibrous core has a core weight that ranges from 400 to 2,000 grams per square meter.

4. The fibrous vehicle underbody shield of claim 3, wherein said latex impregnation has an applied weight that ranges from 20 to 50 percent of said core weight giving said non-woven fibrous material a finished product bulk density that ranges from 0.21 to 1.06 grams per cubic centimeter.

5. The fibrous vehicle underbody shield of claim 4, wherein said fibrous core has a core bulk density that ranges from 0.1 grams per cubic centimeter to 0.8 grams per cubic centimeter.

6. The fibrous vehicle underbody shield of claim 5, wherein said latex impregnation gives said fibrous core an unconsolidated flex modulus that is greater than 350 megapascal and a consolidated flex modulus that is greater than 1,000 megapascal.

7. The fibrous vehicle underbody shield of claim 5, wherein said latex impregnation gives said fibrous core a high speed impact strength that is greater than 3.0 Joules and a breaking force that is greater than 500 Newtons.

8. The fibrous vehicle underbody shield of claim 4, wherein said non-woven fibrous material of said fibrous core contains 50 to 75 percent regenerated PET and 25 to 50 percent fiberglass by weight.

9. The fibrous vehicle underbody shield of claim 4, further comprising:
   at least one attachment location including a throughbore and a flange;
   said throughbore extending through said fibrous core from said first surface to said second surface for receiving a fastener;
   said non-woven fibrous material at said flange being compressed such that said final product thickness at said flange is reduced; and
   said latex impregnation being co-extensive with said flange giving said at least one attachment location an in-plane bolt pull-through strength that is greater than 165 Newtons and an out-of-plane bolt pull-through strength that is greater than 275 Newtons.

10. The fibrous vehicle underbody shield of claim 2, wherein said fiber finish is a coating on said fibers of said regenerated PET.

11. The fibrous vehicle underbody shield of claim 2, wherein said fiber finish is a coating on said fibers of said fiberglass.

12. The fibrous vehicle underbody shield of claim 1, wherein said non-woven fibrous material of said fibrous core is a combination of regenerated PET and natural fibers.

13. The fibrous vehicle underbody shield of claim 12, wherein said fibrous core has a core bulk density that ranges from 0.1 grams per cubic centimeter to 0.8 grams per cubic centimeter.

14. The fibrous vehicle underbody shield of claim 13, wherein said latex impregnation gives said fibrous core an unconsolidated flex modulus that is greater than 250 megapascal and a consolidated flex modulus that is greater than 500 megapascal.

15. The fibrous vehicle underbody shield of claim 13, wherein said latex impregnation gives said fibrous core a high speed impact strength that is greater than 0.5 Joules and a breaking force that is greater than 500 Newtons.

16. The fibrous vehicle underbody shield of claim 12, wherein said non-woven fibrous material of said fibrous core contains 50 to 75 percent regenerated PET and 25 to 50 percent natural fibers by weight.

17. The fibrous vehicle underbody shield of claim 12, wherein said natural fibers are kenaf fibers.

18. The fibrous vehicle underbody shield of claim 12, further comprising:
   at least one attachment location including a throughbore and a flange;
   said throughbore extending through said fibrous core from said first surface to said second surface for receiving a fastener;
   said non-woven fibrous material at said flange being compressed such that said final product thickness at said flange is reduced; and
   said latex impregnation being co-extensive with said flange giving said at least one attachment location an in-plane bolt pull-through strength that is greater than 150 Newtons and an out-of-plane bolt pull-through strength that is greater than 250 Newtons.

19. The fibrous vehicle underbody shield of claim 1, wherein said latex impregnation is one of a thermoset water based acrylic copolymers or a thermoplastic water based acrylic copolymers.

20. The fibrous vehicle underbody shield of claim 1, wherein said impregnation distance is less than said final product thickness such that said latex impregnation does not extend completely through said non-woven fibrous material of said fibrous core.

21. The fibrous vehicle underbody shield of claim 1, wherein said latex impregnation is disposed on both said first surface and said second surface.

22. The fibrous vehicle underbody shield of claim 1, wherein said fibrous core includes an untreated edge that is free of said latex impregnation.

23. A fibrous vehicle underbody shield comprising:
a fibrous core of non-woven fibrous material;
said non-woven fibrous material including a plurality of fibers that are mechanically entangled with each other;
a latex impregnation disposed in said non-woven fibrous material of said fibrous core; and
said plurality of fibers of said non-woven fibrous material having a coating, wherein said coating contains an emulsion of fatty acid that adheres to said latex and withstands a heat exposure of at least 200 degrees Celsius.

24. The fibrous vehicle underbody shield of claim 23, wherein said coating is a spin finish that is chemically compatible to bond to regenerated PET, fiberglass, and latex.

25. The fibrous vehicle underbody shield of claim 24, wherein said non-woven fibrous material of said fibrous core is a material consisting essentially of regenerated PET and fiberglass.

26. The fibrous vehicle underbody shield of claim 25, wherein said latex impregnation is a water based acrylic copolymer.

\* \* \* \* \*